P. F. MURRAY.
AUTOMATIC FEED STARTER FOR DRILL PRESSES.
APPLICATION FILED MAR. 2, 1917.
1,262,235.
Patented Apr. 9, 1918.
2 SHEETS—SHEET 1.
Fig. 1.
Fig. 2.
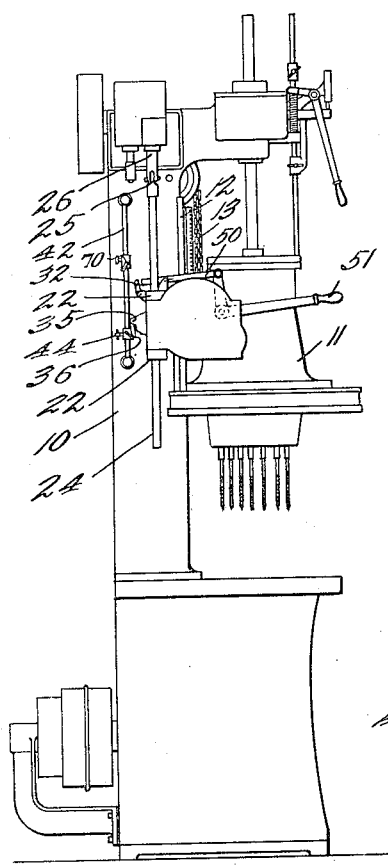
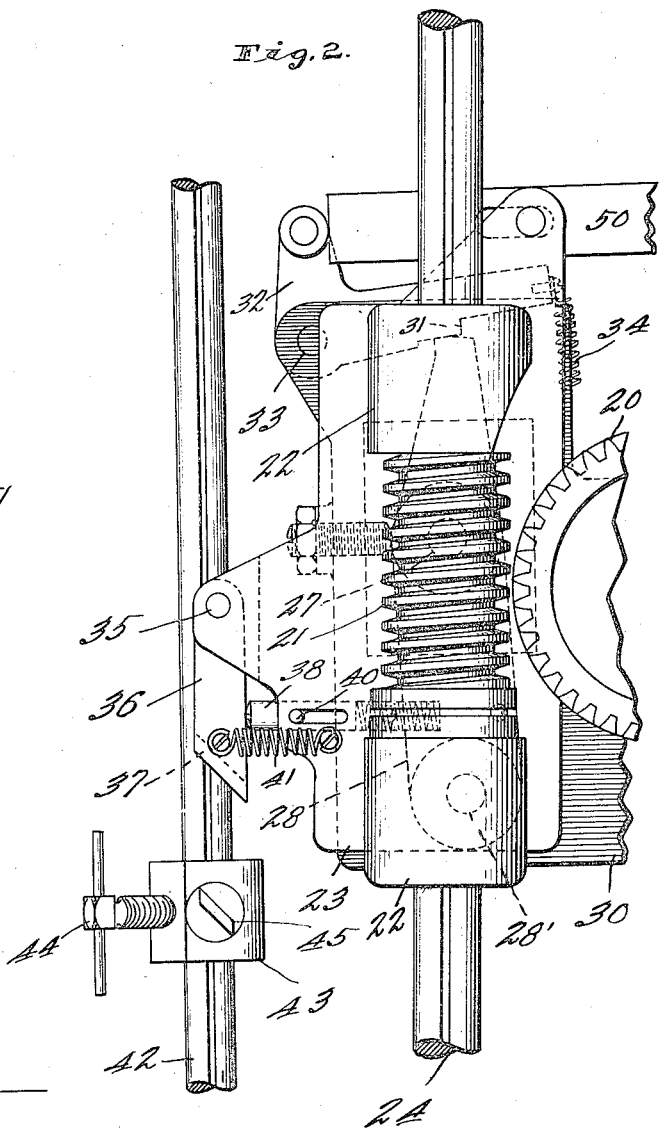
WITNESSES:
Frank A. Fahle
Louise Bennett
INVENTOR
PETER F. MURRAY,
BY
Hood & Schley
ATTORNEYS

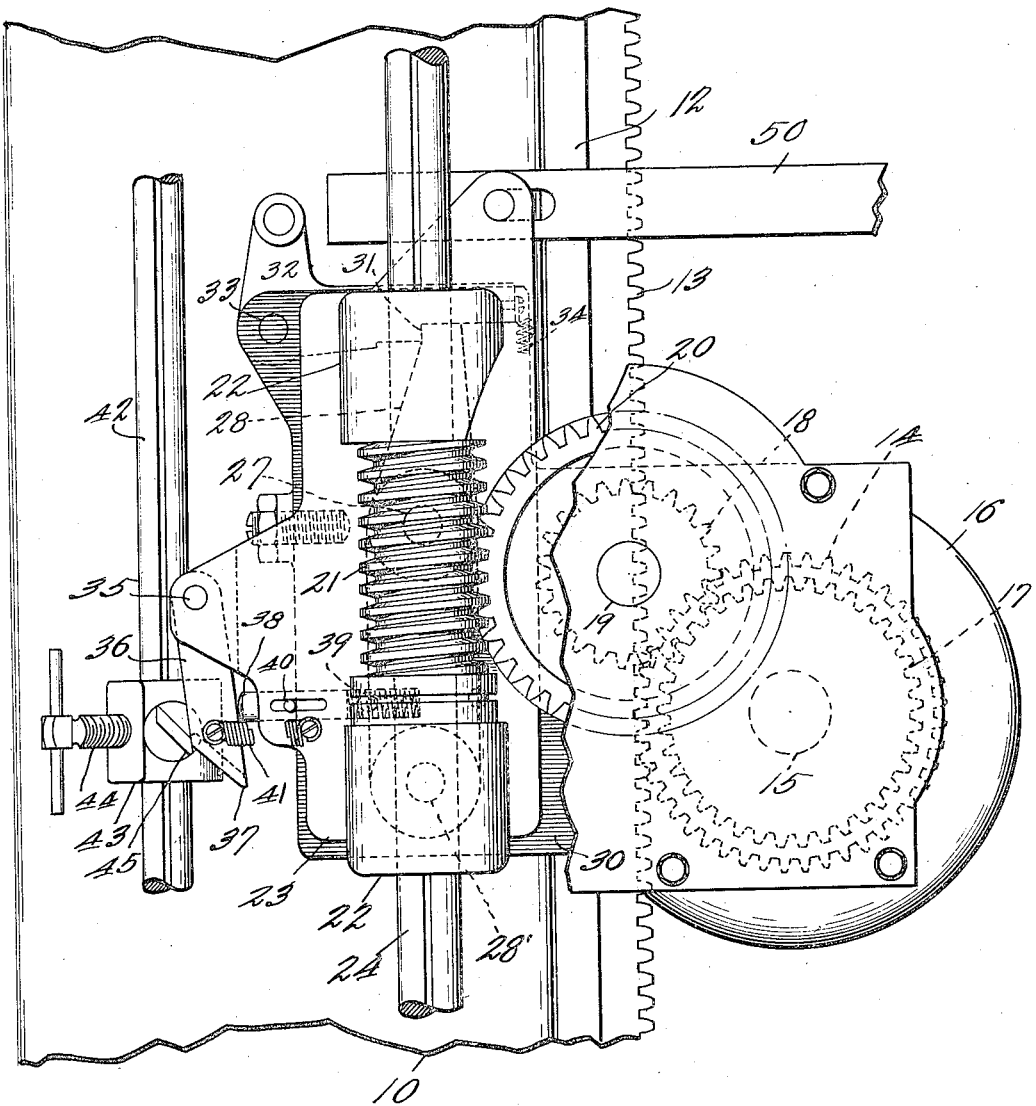

UNITED STATES PATENT OFFICE.

PETER F. MURRAY, OF PHILADELPHIA, PENNSYLVANIA, ASSIGNOR TO THE NATIONAL AUTOMATIC TOOL COMPANY, OF RICHMOND, INDIANA, A CORPORATION OF INDIANA.

AUTOMATIC FEED-STARTER FOR DRILL-PRESSES.

1,262,235. Specification of Letters Patent. Patented Apr. 9, 1918.

Application filed March 2, 1917. Serial No. 151,956.

*To all whom it may concern:*

Be it known that I, PETER F. MURRAY, a citizen of the United States, residing at Philadelphia, in the county of Philadelphia and State of Pennsylvania, have invented a new and useful Automatic Feed-Starter for Drill-Presses, of which the following is a specification.

In the operation of drill presses, especially of the multiple spindle type, the spindle head is moved downwardly by hand until the drills come into engagement with the work, and automatic feeding mechanism is then thrown in by hand to automatically feed the drills downwardly through the working stroke. In order to give the operator greater freedom of operation, and in order to save time, it is the object of my present invention to provide means by which the automatic feeding mechanism may be automatically thrown into operative condition by the completion of the hand-fed downward movement of the spindle head, the construction being such that it may be adjusted to any desired position and such that its operation will not be hindered by any lack of registry between the feeding gears at the time of completion of the hand-fed downward movement of the drill spindle.

The accompanying drawings illustrate my invention.

Figure 1 is a side elevation; Fig. 2 a detail of a portion of the automatic feeding gears, together with my improved knock in device, the parts being shown in the positions occupied during the hand feeding movement of the drill spindle; Fig. 3 a view similar to Fig. 2, showing the parts in the position where the feeding gears have just been thrown into connection for automatic feeding operation.

In the drawings, 10 indicates the column of a drill press 11, the spindle-carrying head mounted to slide vertically upon suitable guides 12 on column 10. Column 10 carries a rack 13 which is engaged by a gear 14 carried by a shaft 15, having a hand wheel 16, by means of which the head 11 may be moved vertically in either direction by hand by rotation of shaft 15. Shaft 15 also carries a gear 17 which meshes with a gear 18 carried by a shaft 19 provided with a worm wheel 20 arranged to be engaged by a worm 21 carried between bearings 22, 22 on bracket 23. The worm 21 is splined upon a shaft 24 which is supported by a universal joint 25 from shaft 26 driven by any suitable train of gearing, not shown, connected to the driving shaft of the drill press. The bracket 23 in the structure shown in the drawings is provided with a pin 27 (dotted lines Figs. 2 and 3) which is pivotally supported in a vertically-arranged link 28 pivoted at 28' upon the casing 30 within which the gears 14, 17, 18 and 20 are arranged, said casing being carried by head 11. Movement of arm 28 toward the left (Figs. 2 and 3) is limited by the temper screw 60. At its free end the arm 28 is arranged to be engaged by the shoulder 31 of the pawl 32 pivoted at 33 and yieldingly urged in one direction by a spring 34. Pivoted at 35 on bracket 23 is depending arm 36 provided with a laterally extended inclined finger 37. Mounted in bracket 23 is a plunger 38 movable substantially at right angles to the axis of shaft 24, said plunger being mounted in a suitable pocket in bracket 23 and having a spring 39 (dotted lines Figs. 2 and 3) as a foundation, said spring tending to normally project plunger 37 outwardly. The outward movement of the plunger is limited by the pin and slot arrangement 40. Arm 36 is held in engagement with the outer end of plunger 38 by a spring 41 of less strength than spring 39.

Arranged alongside of shaft 24 is a rod 42 upon which is mounted a vertically adjustable block 43 held in any desired position of vertical adjustment by screw 44. Block 43 carries an inclined laterally projecting finger 45 adapted to be engaged by finger 37 and to cause an inward swinging of arm 36 as a result of the downward movement of bracket 23, and an outward swinging of said finger as a result of an upward movement of said bracket as finger 37 passes finger 45.

Rod 42 is adapted to carry another block 70 capable of coöperating with latch 32 at the extreme desired downward movement of head 11 in order to automatically disconnect the feed gearing.

The operation is as follows:—Under normal conditions, latch 32 is in the position shown in Fig. 2, having been thrown to that position either by automatic knock out mechanism or by a shifting of the rod 50 by means of a hand lever 51, and this position of latch 32 permits arm 28 to swing to the position indicated in Fig. 2, this swinging movement being the result of the thrust of the worm 21 on gear 20 and serving to separate worm 21 from gear 20. The worm 21 is continuously rotated and when head 11 is moved downwardly by a hand actuation of wheel 16, finger 37 will, at the desired moment, come into contact with finger 45 and will be swung inwardly thereby, in that manner exerting a pressure, through plunger 38 and spring 39, upon bracket 23, tending to swing said bracket inwardly so as to move worm 21 into engagement with worm wheel 20. If, at this moment, the teeth of the worm 21 register with the teeth of wheel 20, there will be immediate engagement, but there is greater probability of there being a lack of registry at the particular moment when finger 37 engages finger 45 and it is for this reason that the spring 39 is provided. If worm 21 is not in correct registry with wheel 20, arm 36 is nevertheless free to swing inwardly to its full extent, plunger 38 also being driven inwardly to its full extent, but spring 39 is compressed until there has been sufficient rotation of worm 21 to bring it into registry with wheel 20, whereupon spring 39 serves to drive the bracket 23 to the right (Figs. 2 and 3), arm 28 swinging on its pivot 28' until the free end of the arm moves to the right of shoulder 31, whereupon spring 34 swings latch 32 into locking position, as shown in Fig. 3, and holds the worm 21 in mesh with gear 20.

By the above described arrangement, the automatic feeding operation of the head 11 is begun as a result of the hand manipulation of head 11 as it is brought down quickly to bring the drills into engagement with the work. The operator is, therefore, free, in the use of his hands, in manipulating the head 11 and holding the work.

As previously stated, the automatic downward feeding of the head 11 may be discontinued automatically by a manipulation of the latch 32 by mechanism which forms no part of my present invention and has been omitted from the drawings for the sake of clearness.

The upward movement of head 11 is accomplished by hand manipulation of wheel 16 and as the inclined finger 37 comes into engagement with the lower face of finger 45, arm 36 is swung outwardly and is then brought back into engagement with plunger 38 by the action of spring 41, so that the finger 45, in any position of its vertical adjustment, does not interfere with the return movement of the parts.

I claim as my invention:

1. In an automatic knock in device for drill presses and similar tools, the combination with the main body, the vertically movable tool holder, hand-controlled means for shifting the tool holder, and power driven means for shifting the tool holder, comprising a worm wheel and a worm, of a shifting support for said worm whereby it may be moved laterally into and out of engagement with its worm wheel, an adjustable block arranged alongside the path of travel of the tool holder, a member carried by the said shifting support and laterally movable relative thereto by engagement with said block, and a spring interposed between said last-mentioned member and the shifting support.

2. In an automatic knock in device for drill presses and similar tools, the combination with the main body, the vertically movable tool holder, hand-controlled means for shifting the tool holder, and power driven means for shifting the tool holder, comprising a worm wheel and a worm, of a shifting support for said worm, whereby it may be moved laterally into and out of engagement with its worm wheel, an adjustable block arranged alongside the path of travel of the tool holder, an arm carried by said shifting support and laterally movable relative thereto in opposite directions by engagement with said block, a plunger mounted in the support and movable laterally relative to the worm and in position to be engaged by the aforesaid arm, a spring interposed between said plunger and the shifting support, and a spring acting upon the aforesaid arm to hold the same in engagement with the plunger.

3. In an automatic knock in device for drill presses and similar tools, the combination with a main body, the vertically movable tool holder, hand-controlled means for shifting the tool holder, and power driven means for shifting the tool holder, comprising a pair of meshing gears, one movable laterally into and out of engagement with the other, a shifting support for said laterally movable gear, an adjustable block arranged alongside the path of travel of the tool holder, an arm carried by said shifting gear support and laterally movable relative thereto by engagement with said block, and a spring interposed between said last-mentioned arm and the shifting support.

4. In an automatic knock in device for drill presses and similar tools, the combination with the main body, the vertically movable tool holder, hand-controlled means for shifting the tool holder, and power driven means for shifting the tool holder, comprising separable members, one movable into and out of registry with the other, an adjustable block arranged alongside the path of travel of the tool holder, an operating member engageable by said block and movable thereby in opposite directions from a medial position by opposite movements of the tool holder, and a spring interposed between said operating member and that driving member which is movable into and out of registry with its mating member, whereby movement of the tool holder in one direction will serve to bring the separable driving members together through the action of the spring.

5. In an automatic knock in device for drill presses and similar tools, the combination with a main body, a vertically movable tool holder, hand-controlled means for shifting the tool holder, and power-driven means for shifting the tool holder, comprising a pair of meshing gears, one movable laterally into and out of engagement with the other, of a shifting support for said laterally moving gear, a swinging arm supporting said shiftable support, a latch for holding said arm in position to retain the gears in mesh, an adjustable block arranged alongside the path of travel of the tool holder, an arm carried by said shifting gear support and laterally movable relative thereto by engagement with said block, and a spring interposed between said last-mentioned arm and the shifting support.

In witness whereof, I PETER F. MURRAY have hereunto set my hand at West Orange, New Jersey, this 15th day of February, A. D. one thousand nine hundred and seventeen.

PETER F. MURRAY